(12) United States Patent
Zhang

(10) Patent No.: US 12,014,590 B2
(45) Date of Patent: Jun. 18, 2024

(54) BLUETOOTH COMMUNICATION CIRCUIT AND VEHICLE KEY CONTAINING THE SAME

(71) Applicants: Inventec (Pudong) Technology Corporation, Shanghai (CN); INVENTEC CORPORATION, Taipei (TW)

(72) Inventor: You Zhang, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 154 days.

(21) Appl. No.: 17/946,144

(22) Filed: Sep. 16, 2022

(65) Prior Publication Data
US 2023/0410583 A1   Dec. 21, 2023

(30) Foreign Application Priority Data
Jun. 20, 2022  (CN) .......................... 202210700754.2

(51) Int. Cl.
G07C 9/00 (2020.01)

(52) U.S. Cl.
CPC ................. *G07C 9/00896* (2013.01)

(58) Field of Classification Search
None
See application file for complete search history.

(56) References Cited

U.S. PATENT DOCUMENTS 7,299,127 B2 * 11/2007 Willer .................... G01S 19/35
                                                                 701/487

* cited by examiner

*Primary Examiner* — K. Wong
(74) *Attorney, Agent, or Firm* — Locke Lord LLP; Tim Tingkang Xia, Esq.

(57) ABSTRACT

A Bluetooth communication circuit, comprising: a microcontroller for providing a Bluetooth signal; a surface acoustic wave filter signally connected to the surface acoustic wave filter; an antenna component signally connected to the surface acoustic wave filter; a first matching inductor, with one end connected between the microcontroller and the surface acoustic wave filter and with another end connected to a common ground; and a second matching inductor, with one end connected between the surface acoustic wave filter and the antenna assembly and with another end connected to the common ground.

16 Claims, 5 Drawing Sheets

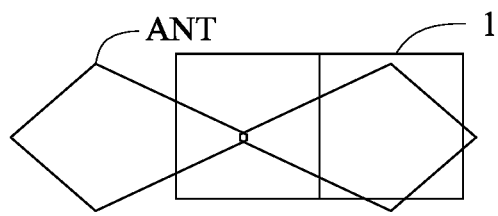
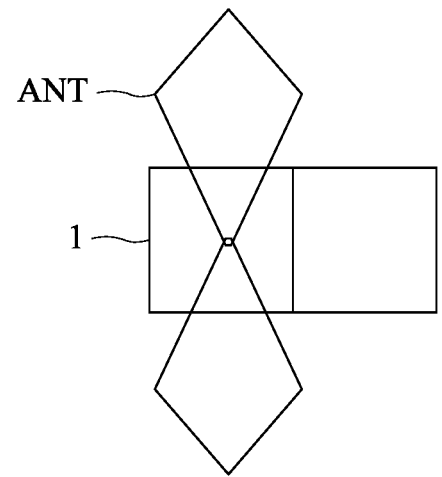
FIG. 4a      FIG. 4b
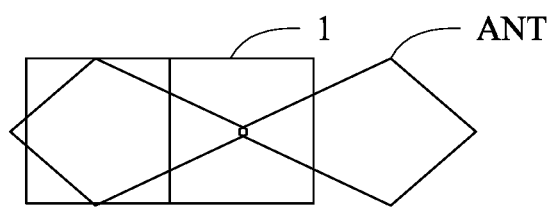
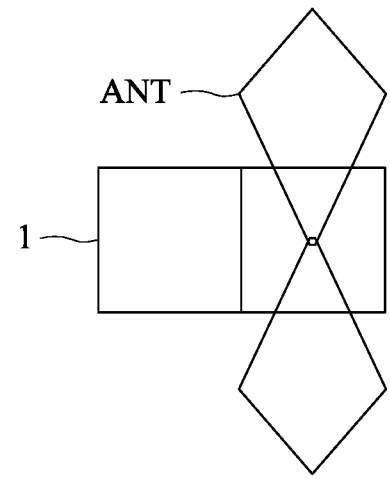
FIG. 4c      FIG. 4d

BLUETOOTH COMMUNICATION CIRCUIT AND VEHICLE KEY CONTAINING THE SAME

CROSS-REFERENCE TO RELATED APPLICATIONS

This non-provisional application claims priority under 35 U.S.C. § 119(a) on Patent Application No(s). 202210700754.2 filed in China on Jun. 20, 2022, the entire contents of which are hereby incorporated by reference.

BACKGROUND

1. Technical Field

This disclosure relates to a Bluetooth communication circuit, particularly to a Bluetooth communication circuit used in vehicle key.

2. Related Art

With the standard of living rising, automobiles become more and more common, and while meeting the requirement of safety and comfort, automobiles also face complicated electromagnetic environments. This is what causes the need of a higher standard for the safety, reliability, and compatibility of electronic devices between vehicles, therefore, the Electromagnetic Compatibility test (EMC test) has become a critical section of the automotive manufacturing quality system. Automotive EMC test, or EMC test, refers to a comprehensive evaluation to automotive about its electromagnetic sensitivity (EMS) and electromagnetic interference (EMI) against the electromagnetic field.

The electromagnetic immunity of vehicles is one of the preconditions to ensure that vehicles can operate normally in a strict electromagnetic environment, and the Radiated Immunity (RI) testing is an important testing item among a plurality of EMC testing projects. Today, the RI testing in EMC testing is mainly performed according to the standard ISO 11452-2.

SUMMARY

Accordingly, this disclosure provides a Bluetooth communication circuit and vehicle key containing the same.

According to one or more embodiment of this disclosure, a Bluetooth communication circuit comprises: a microcontroller providing a Bluetooth signal; a surface acoustic wave filter signally connecting to the microcontroller; an antenna component signally connecting to the surface acoustic wave filter; a first matching inductor, with one end connected between the microcontroller and the surface acoustic wave filter, and the other end connected to a common ground; and a second matching inductor, with one end connected between the surface acoustic wave filter and the antenna component, and the other end connected to the common ground.

According to one or more embodiment of this disclosure, a vehicle key comprises: a case; and a circuit board, disposed in the case and loading the Bluetooth communication circuit as described above.

In view of the above description, the Bluetooth communication circuit and vehicle key containing the same of this disclosure redesign and optimize the hardware circuit of the Bluetooth portion of the vehicle key, to make the vehicle key pass the hand-held antenna testing, and to solve the problem which the vehicle key project can't pass the RI testing in the EMC testing, thereby simplifying mechanical design and reducing costs on a certain level.

The above descriptions of the content of this disclosure and the following illustrations about the embodiments serve to demonstrate and explain the spirit and the principle of the present invention, and to provide further explanations to the claims of the present invention.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein:

FIGS. 4a to 4d are each a respective schematic diagram illustrating the directional relationship between the vehicle key and the hand-held antenna in the RI testing according to an embodiment of the present disclosure.

DETAILED DESCRIPTION

Figure 1:
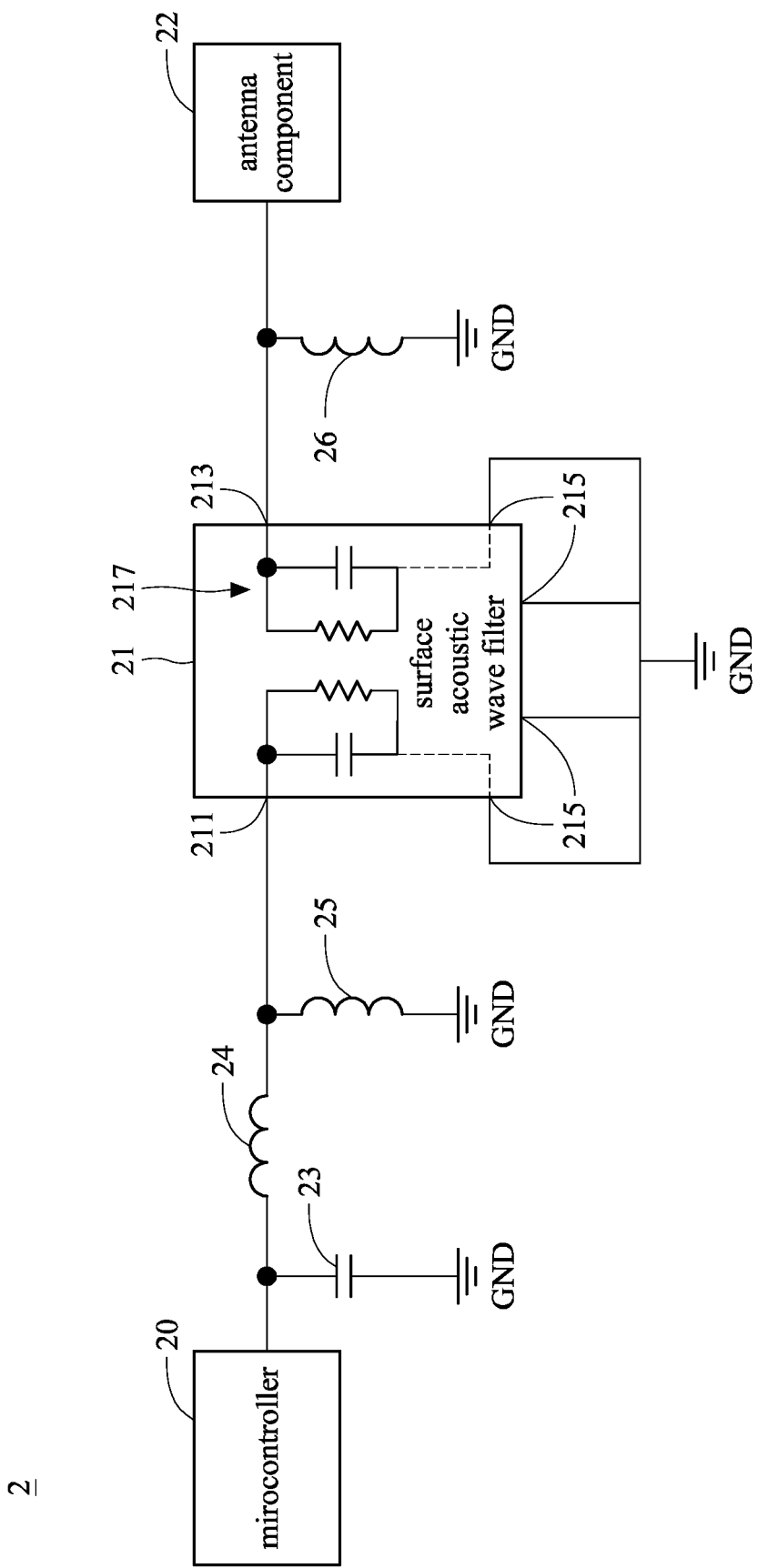
FIG. 1 is a circuit diagram illustrating a Bluetooth communication circuit according to an embodiment of the present disclosure.

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

The vehicle key with the Bluetooth communication circuit provided by one or more embodiments of the present invention may be applied to automotive, motorcycles, electric cars, and other vehicles. Bluetooth, generally speaking, refers to a short-range wireless communication standard, for data transmission or data exchange between a placed device and a mobile device. The frequency range of electromagnetic wave used in Bluetooth is within the range of ultra-high frequency (UHF), particularly refers to the electromagnetic wave with a frequency range of 2.4 to 2.5 GHz (corresponding to a wavelength of about 10 centimeters). It should be noted that, although the subject technology of the present disclosure is a Bluetooth antenna circuit, it is not limited by specific numerical range (e.g. the implemented frequency range of electromagnetic wave or the communication range of the Bluetooth). Instead, if the order of magnitude of values of some instances are close enough to the above scientific numerical values, it may be construed as within the scope of the present invention.

As person of ordinary skill in the art can understand, Bluetooth may connect two mobile devices or two placed devices, and the connection of Bluetooth also includes the circumstance of one-to-many or many-to-one (similarly, many-to-many), therefore, the above said Bluetooth for data transmission or data exchange between one placed device and one mobile device is merely an example. In addition, although the subject matter of the present invention is the Bluetooth antenna circuit and the vehicle key containing the same, the scope of the Bluetooth antenna circuit of the present invention is not limited to the area of vehicle communication. For example, the Bluetooth communication circuit of the present invention may be used in data transmission of air conditioning system, so that the mobile device such as smartwatch capable of detecting temperature, heartbeat number, and level of sweating may exchange data with the air conditioning device to achieve automatic room temperature adjustment. In other words, if a module uses the Bluetooth communication circuit disclosed by the present invention, further consideration of whether the circuit achieving the same effect such as reducing interference from environmental noise should be taken to determine whether the circuit is within the scope of the present invention, instead of letting it deviating from the scope of the present invention merely because of its non-vehicle application.

Please refer to FIG. 1 which is a circuit diagram illustrating a Bluetooth communication circuit according to an embodiment of the present disclosure. The electronic elements included in Bluetooth communication circuit 2 shown in FIG. 1 may be mainly categorized into the active element and the passive element. The active element is, except for the capacitor, inductor, resistor, or the like, the electronic element needing external power supply, as shown in FIG. 1 by block diagram. The active elements included in the Bluetooth communication circuit 2 comprise: a microcontroller 20 and a surface acoustic wave filter 21 (SAW filter). The connections between the two active elements and an antenna component are: a pin 211 of the surface acoustic wave filter 21 is signally connected to the microcontroller 20, and another pin 213 of the surface acoustic wave filter 21 is signally connected to the antenna component 22.

As for the active element, the antenna component 22, or the known element, there is no unnecessary explanation to the working principle or internal configuration about them. The antenna component may be F-type antenna or any other type of antenna, which is not limited by the present invention.

In contrast, the surface acoustic wave filter 21 (SAW filter) of the present invention is briefly depicted as following. The SAW filter mainly uses the characteristic of piezoelectric material to transform the electric energy into the surface vibration energy to achieve an effect of filtering the electromagnetic wave of a specific frequency range. Compared to the SAW filter, another similar filter is the body acoustic wave filter (BAW filter), and the major difference between the two filters is that the vibrational acoustic wave generated by the filter is limited to the material surface or can pass through the bulk material, which is the difference between 2-D vibration and 3-D vibration. The candidate for the material of the SAW filter usually is single-crystal or polycrystal ceramic material, including SiO2, LiNbO3, LiTaO3, or the like. The reasons for these materials are suitable for the SAW filter is because the distance between atoms may be changed by the applied voltage, and for the same reason, the occurrence of a change of distance between atoms may also induce the electric field.

The Bluetooth antenna circuit 2 further comprises passive elements, including a first matching inductor 25 with one end connected between the microcontroller 20 and the SAW filter 21, and with another end connected to the common ground GND, and a second matching inductor 26 with one end connected between the SAW filter 21 and the antenna 22, and another end connected to the common ground GND. The inductance of the first matching inductor 25 and the second matching inductor 26 may be but not limited to 5.1 nH.

In the embodiment shown in FIG. 1, the SAW filter 21 may comprise six pins 211 to 215, wherein the pin 211 is connected to the microcontroller 20, the pin 213 is connected to the antenna component 22, and the remaining four pins are connected to the common ground GND, and may comprise a built-in circuit 217 with built-in capacitors and resistors. The pin 211 of the SAW filter 21 of this embodiment can be connected between the microcontroller 20 and the first matching inductor 25, and the pin 213 is connected between the antenna component 22 and the second matching inductor 26. In addition, other embodiments may also comprise an SAW filter in other forms, e.g. with 8 ports, and the scope of the present invention is not limited to the implementation of that, which is merely used for explanation.

In the embodiment shown in FIG. 1, the Bluetooth antenna circuit 2 also selectively includes the matching capacitor 23 and the output inductor 24. That is, the Bluetooth antenna circuit 2 may only include the matching capacitor 23, only include the output inductor 24, or include none of both. The matching capacitor 23 may connect between the microcontroller 20 and the SAW filter 21 with one end and connect to the common ground GND with another end. Choosing proper matching capacitor 23 may further reduce the signal interference and stabilize the circuit performance. In the present embodiment, the capacitance of the matching inductor 23 may be but is not limited to 0.5 pF.

The output inductor 24 may connect between the microcontroller 20 and the matching capacitor 23 with one end, and connect between the SAW filter 21 and the first matching inductor 25 with another end. Choosing proper inductor may further reduce the signal interference and stabilize the circuit performance. In the present embodiment, the inductance of the output inductor 24 may be but is not limited to 5.1 nH.

Figure 2:
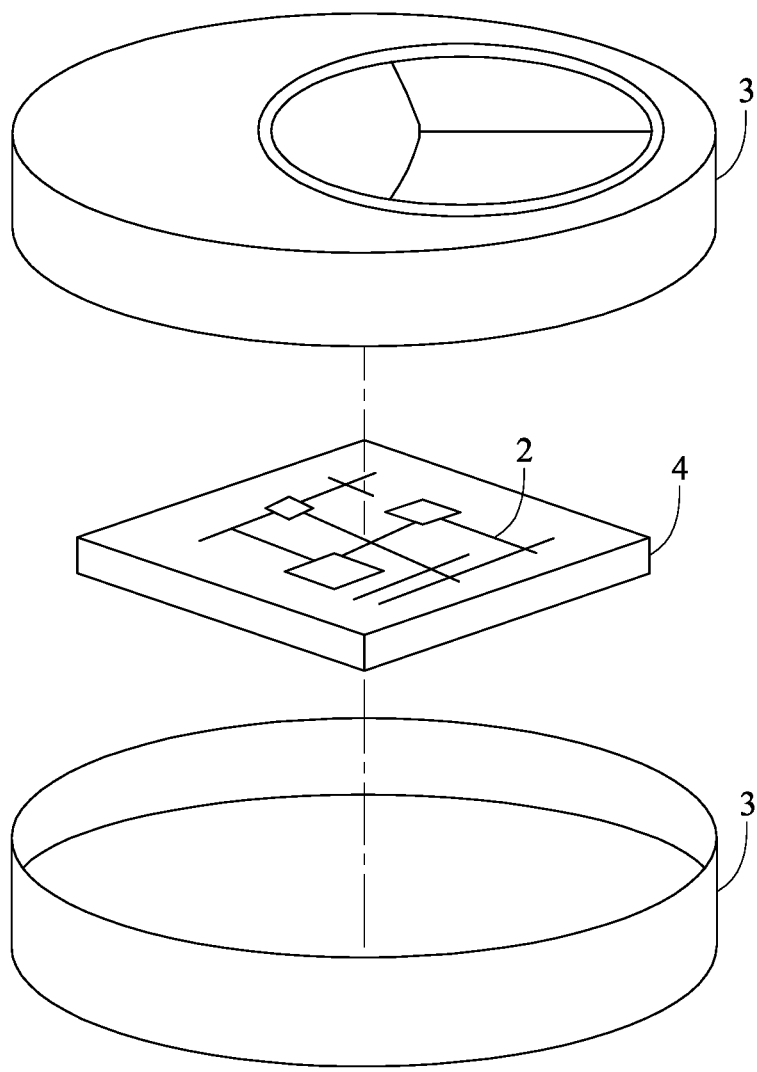
FIG. 2 is an exploded view schematically illustrating a vehicle key according to an embodiment of the present disclosure.

The above Bluetooth communication circuit 2 may be loaded on a circuit board and protected by a case for encapsulating, to form the vehicle key of the present invention. Please refer to FIG. 2 which is an exploded view schematically illustrating a vehicle key according to an embodiment of the present disclosure. In the embodiment shown in FIG. 2, the Bluetooth communication circuit 2 may be disposed on the circuit board 4 and encapsulated in the case 3. It should be noted that, although the case 3 of the present invention is presented in a shape of a normal vehicle key, other embodiments may be carried out in different forms such as phone casing. In other words, a device with the Bluetooth communication circuit, the circuit board, and the case of the present disclosure should be within the scope of the vehicle key of the present invention.

Figure 3:
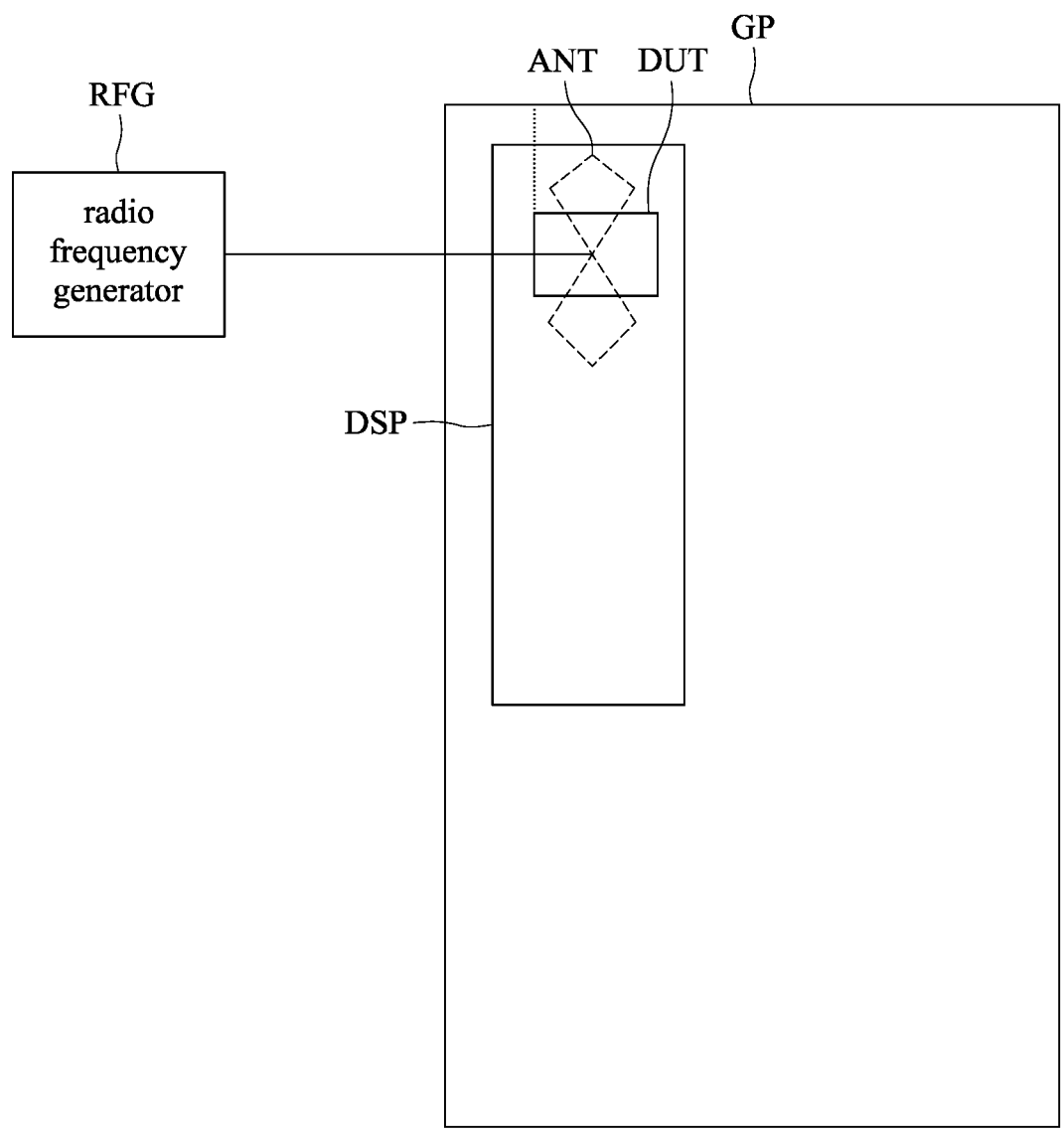
FIG. 3 is a schematic view illustrating an RI testing environment applicable to the vehicle key according to an embodiment of the present disclosure.

Please refer to FIG. 3 which is a schematic view illustrating an RI testing environment applicable to the vehicle key according to an embodiment of the present disclosure. As described in the related art of the present disclosure, the RI testing in the EMC testing is configured to place a device under test DUT in a strong electromagnetic field environment, to simulate the possible electromagnetic interference source such as phones, motors, various external circuits, or the like in the practical application. Specifically, a device under test DUT may be disposed on the dielectric support plane DSP on the ground plane GP, and the radio frequency generator RFG disposed on the device under test DUT can emit radio frequency signals at different frequencies to the device under test DUT through the hand-held antenna ANT to check the electromagnetic immunity of the device under test DUT. Relevant testing details such as the distance between the device under test DUT and the hand-held antenna ANT is according to ISO 11452-2 of international standards on automotive EMC issues, which is not described herein.

The RI testing environment shown in FIG. 3 needs to be set up in a shielding room to preclude interference from an external electronic device, and the device under test DUT may specifically be the vehicle key of the embodiment described above. In the RI testing, the radiation frequency and the radiation power are two main testing parameters. Please refer to the following table 1, the RI testing requirement has various frequency ranges, including 360 to 480 MHz, 800 to 1000 MHz, 1600 to 1950 MHz, 1950 to 2200 MHz, 2400 to 2500 MHz, and 2500 to 2700 MHz, and all of above are required A state. Relevant details may be referred to the standard ISO 11452-2.

TABLE 1

| Frequency(MHz) | Required Function State |
| --- | --- |
| 360~480 | A |
| 800~1000 | A |
| 1600~1950 | A |
| 1950~2200 | A |
| 2400~2500 | A |
| 2500~2700 | A |

Furthermore, please refer to the following table 2, the testing power of every frequency band is different. It should be noted that, electromagnetic interference from various bands are prevented even though the Bluetooth communication circuit of the present invention is within a certain frequency range. The experimental details of the following table such as modulation type, frequency step, or the like can be according to the above relevant standard.

TABLE 2

| Frequency Band(MHz) | Testing Power(W) | | Modulation Type | Frequency Step(MHz) |
| --- | --- | --- | --- | --- |
| | Level 1 | Level 2 | | |
| 360~480 | 4.5 | 9.0 | Phase Modulation (PM), 18 Hz, 50% | 5 |
| 800~1000 | 7.0 | 14.0 | PM, 217 Hz, 12.5% | 10 |
| 1600~1950 | 1.5 | 3.0 | PM, 217 Hz, 12.5% | 20 |
| 1950~2200 | 0.75 | 1.5 | PM, 217 Hz, 12.5% | |
| 2400~2500 | 0.1 | 0.2 | PM, 1600 Hz, 50% | |
| 2500~2700 | 0.25 | 0.5 | PM, 217 Hz, 12.5% | |

Please refer to FIG. 4a to FIG. 4d, which are each a respective schematic diagram illustrating the directional relationship between the vehicle key and the hand-held antenna in the RI testing according to an embodiment of the present disclosure, including situations of the vehicle key 1 is located in different directions and at different positions of the hand-held antenna ANT. As person of ordinary skill in the art can understand, an antenna is directional, and when the directions of the antenna and the signal transmission are more parallel to each other, the capability of receiving signal is higher. In contrast, when the directions of the antenna and the signal transmission are more perpendicular to each other, the capability of receiving signal is lower. Therefore, during the RI testing, an angle between the device under test DUT and the radio frequency generator RFG may also influence the electromagnetic immunity. Specifically, the electromagnetic immunity of the configurations in FIG. 4b and FIG. 4d may be better than that in FIG. 4a and FIG. 4c due to the direction of the hand-held antenna ANT. In addition, the position inside the vehicle key where the Bluetooth communication circuit is located may have an impact on the performance of electromagnetic immunity due to the internal structure of the vehicle key. Specifically, this may cause a difference of the performance of electromagnetic immunity between the configuration in FIG. 4a and the configuration in FIG. 4c, or between the configuration in FIG. 4b and the configuration in FIG. 4d. Accordingly, the Bluetooth communication circuit 2 and the vehicle key 1 containing the same disclosed by the present invention can pass the RI testing specified above, namely, the Bluetooth communication circuit 2 of the present invention has a better capability in electromagnetic immunity.

Figure 5:
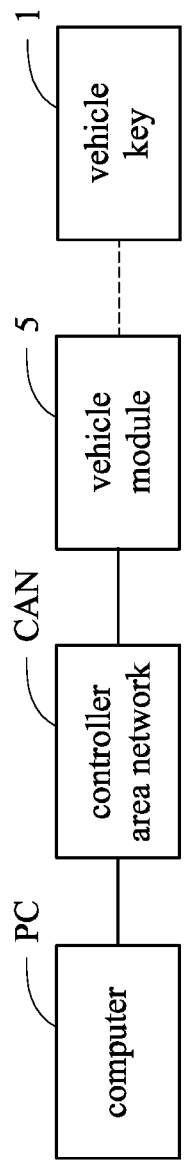
FIG. 5 is a block diagram illustrating a signal connection between the vehicle key and the vehicle module according to an embodiment of the present disclosure.

Please refer to FIG. 5 which is a block diagram illustrating a signal connection between the vehicle key and the vehicle module according to an embodiment of the present disclosure. In this embodiment, for example, a user may install the CANoe software through a computer PC, and use a controller area network CAN to display monitoring data between the vehicle module 5 and the vehicle key 1 to determine whether a Bluetooth communication is successfully made between the vehicle module 5 and the vehicle key 1.

In view of the above description, the Bluetooth communication circuit and vehicle key containing the same of this disclosure redesign and optimize the hardware circuit of the Bluetooth portion of the vehicle key, to make the vehicle key pass the hand-held antenna testing, and to solve the problem which the vehicle key project can't pass the RI testing in the EMC testing, thereby simplifying mechanical design and reducing costs on a certain level.

Although the present invention is disclosed in the foregoing embodiments, it is not intended to limit the present invention. Changes and modifications made without departing from the spirit and scope of the present invention belong to the scope of patent protection of the present invention. For the scope defined by the present invention, please refer to the attached claims.

What is claimed is:

1. A Bluetooth communication circuit, comprising:
   a microcontroller configured to provide a Bluetooth signal;
   a surface acoustic wave filter signally connected to the microcontroller;
   an antenna component signally connected to the surface acoustic wave filter;
   a first matching inductor connected between the microcontroller and the surface acoustic wave filter with one end, and connected to a common ground with another end; and
   a second matching inductor connected between the antenna component and the surface acoustic wave filter with one end, and connected to the common ground with another end.

2. The Bluetooth communication circuit of claim 1, wherein the surface acoustic wave filter has six pins, with one pin of the six pins connected between the microcontroller and the first matching inductor, with another pin of the six pins connected between the antenna component and the second matching inductor, and with the remaining four pins connected to the common ground.

3. The Bluetooth communication circuit of claim 1, wherein the surface acoustic wave filter comprises a built-in circuit formed of a plurality of built-in capacitors and a plurality of resistors.

4. The Bluetooth communication circuit of claim 1, further comprising a matching capacitor, with one end of the matching capacitor connected between the microcontroller and the surface acoustic wave filter, and with another end of the matching capacitor connected to the common ground.

5. The Bluetooth communication circuit of claim 4, wherein a capacitance of the matching capacitor is 0.5 pF.

6. The Bluetooth communication circuit of claim 4, further comprising an output inductor, with one end of the matching capacitor connected between the microcontroller and the matching capacitor, and with another end of the matching capacitor connected between the surface acoustic wave filter and the first matching inductor.

7. The Bluetooth communication circuit of claim 6, wherein the inductance of the output inductor is 5.1 nH.

8. The Bluetooth communication circuit of claim 1, wherein the inductance of the first matching inductor and the second matching inductor are 5.1 nH.

9. A vehicle key, comprising:
a case; and
a circuit board disposed in the case, and loaded with the Bluetooth communication circuit of claim 1.

10. A vehicle key, comprising:
a case; and
a circuit board disposed in the case, and loaded with the Bluetooth communication circuit of claim 2.

11. A vehicle key, comprising:
a case; and
a circuit board disposed in the case, and loaded with the Bluetooth communication circuit of claim 3.

12. A vehicle key, comprising:
a case; and
a circuit board disposed in the case, and loaded with the Bluetooth communication circuit of claim 4.

13. A vehicle key, comprising:
a case; and
a circuit board disposed in the case, and loaded with the Bluetooth communication circuit of claim 5.

14. A vehicle key, comprising:
a case; and
a circuit board disposed in the case, and loaded with the Bluetooth communication circuit of claim 6.

15. A vehicle key, comprising:
a case; and
a circuit board disposed in the case, and loaded with the Bluetooth communication circuit of claim 7.

16. A vehicle key, comprising:
a case; and
a circuit board disposed in the case, and loaded with the Bluetooth communication circuit of claim 8.

* * * * *